(No Model.)
L. B. LATHROP.
Thill Coupling.
No. 234,591. Patented Nov. 16, 1880.
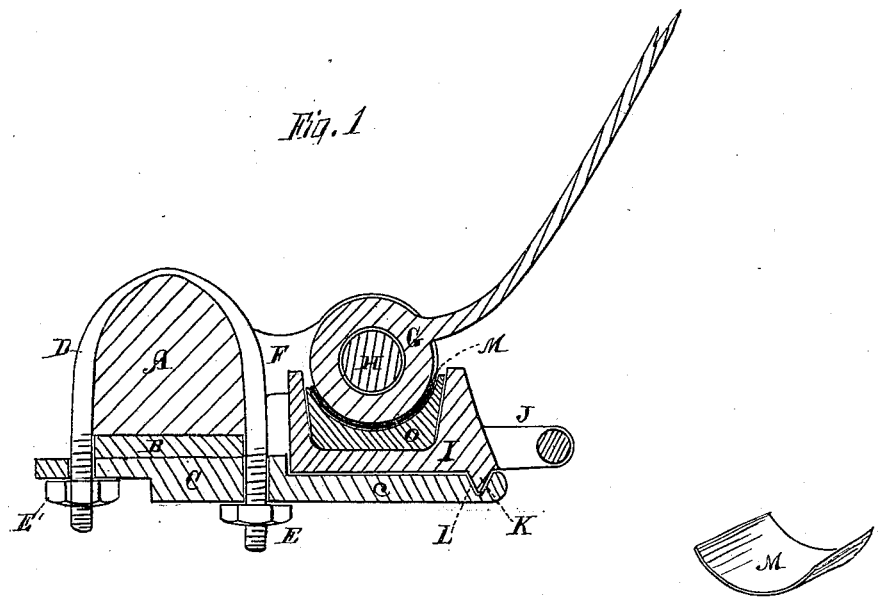
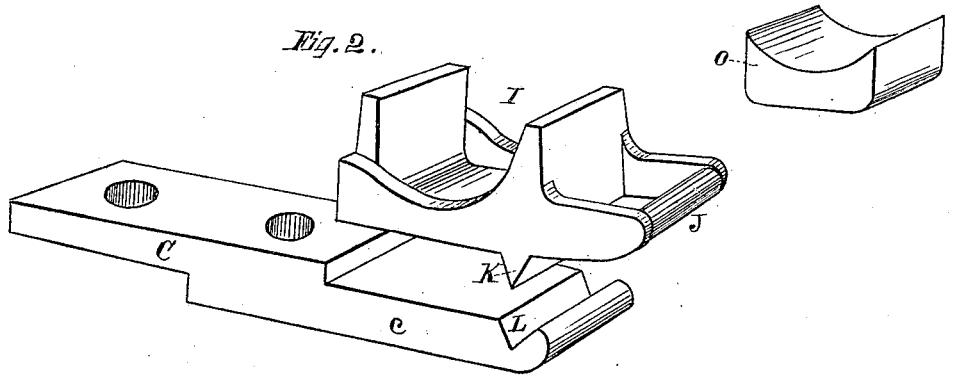
Witnesses
Geo. H. Strong.
Frank N. Brooks
Inventor
Levi B. Lathrop
By Dewey & Co.
Attys

UNITED STATES PATENT OFFICE.

LEVI B. LATHROP, OF HOLLISTER, CALIFORNIA.

THILL-COUPLING.

SPECIFICATION forming part of Letters Patent No. 234,591, dated November 16, 1880.

Application filed September 10, 1880. (No model.)

*To all whom it may concern:*

Be it known that I, LEVI B. LATHROP, of Hollister, county of San Benito, and State of California, have invented an Improved Thill-Coupling; and I hereby declare the following to be a full, clear, and exact description thereof.

My invention relates to certain improvements in thill-couplings; and it consists in certain details of construction, as hereinafter described and claimed, combined with an independent holding seat or plate, within which an elastic block may be supported beneath the joint which unites the thill or pole to the vehicle to prevent rattling. This independent seat is provided with a V-shaped projection from its lower surface, which fits into a corresponding groove in the clip-bar, the front end of which is extended out beneath the seat, so as to support it, and so that when the rubber becomes worn the seat and rubber may be raised to make a close fit, by screwing up the nut upon the front clip-bolt, without other device or attachment, as will be more fully described by reference to the accompanying drawings, in which—

Figure 1 is a sectional view. Fig. 2 shows the parts separated.

A is the front axle; B, the axle-bed of any vehicle. C is the clip-bar, and D the clip, having ends which extend through holes in the clip-bar, and with screw-threads, upon which nuts E E' turn, so as to hold the axle and bed firmly together.

The clips D have lugs F projecting to the front, between which the end G of the thill or pole is inserted and held by a bolt, H, in the usual manner. Various devices are employed to prevent the rattling of this joint, the most common of which is the use of a rubber block, either behind or below the joint. In my invention I place the rubber or elastic block below the joint, so that it presses upward.

My invention consists of an independent seat, box, or cup, I, within which the elastic block O is placed, and this cup is supported upon and adjusted by an extension, c, of the clip-bar, so that by screwing up the nut E the cup, with its contained elastic block, will be moved up closer to the joint whenever it is necessary.

The cup is formed of malleable iron or in any other suitable manner, and has the loop J formed upon its front side to receive the safety-strap. In order to secure the cup to the extension c, a V-shaped projection, K, is formed upon its lower side, and a corresponding groove, L, extends across the front edge of the extension c to receive this projection.

By this construction it will be seen that the cups I may be made in quantity in an inexpensive manner, and the clip-bars C, with the grooved extension c, may be substituted for those in ordinary use, so that the device may be applied to vehicles already in use with but little alteration. These boxes may be thus made as a part of the stock of dealers, like other carriage-stock.

As the tension of the rubber within the cup is adjusted by means of the forward nut, E, of the clip-bar, it will be seen that no extra screws or adjusting devices will be needed. The box I may be removed at any time for the purpose of replacing the rubber without disturbing any other portion of the vehicle, and when the nut E is screwed up it will be held by its V-shaped projection, so that it will not move.

In order to prevent undue wear of the curved surface of the rubber which fits against the rounded joint end of the thill or pole iron, I form a thin curved plate of metal, M, which is fitted between the two, and this may be lubricated, if desired, so that the constant motion of the shafts or pole when traveling will not wear either the joint or the rubber.

I am aware that elastic buffers have been placed below the joints of thill-couplings, and also that these rubbers have been adjusted by means of a set-screw and plate. I do not therefore claim, broadly, such devices; but,

Having thus described my invention, what I do claim as new, and desire to secure by Letters Patent, is—

1. The independent cup, box, or seat I, adapted to hold a rubber or other elastic buffer, O, and having a projection or projections, K, in combination with the extension c of the clip-bar, with its corresponding groove or depression, whereby the box is retained and adjusted by means of the nuts which secure the clip-bar, substantially as herein described.

2. As a new article of manufacture, the independent box or seat I, having the safety-strap hook J formed upon its front, and the locking or holding projection K upon its lower surface, substantially as and for the purpose herein described.

In witness whereof I have hereunto set my hand.

L. B. LATHROP.

Witnesses:
FRANK A. BROOKS,
S. H. NOURSE.